No. 718,955. PATENTED JAN. 20, 1903.
G. H. SMITH.
ADJUSTABLE ATTACHMENT FOR HORIZONTAL SPINDLE DRILLING
AND BORING MACHINES.
APPLICATION FILED NOV. 7, 1901.
NO MODEL.
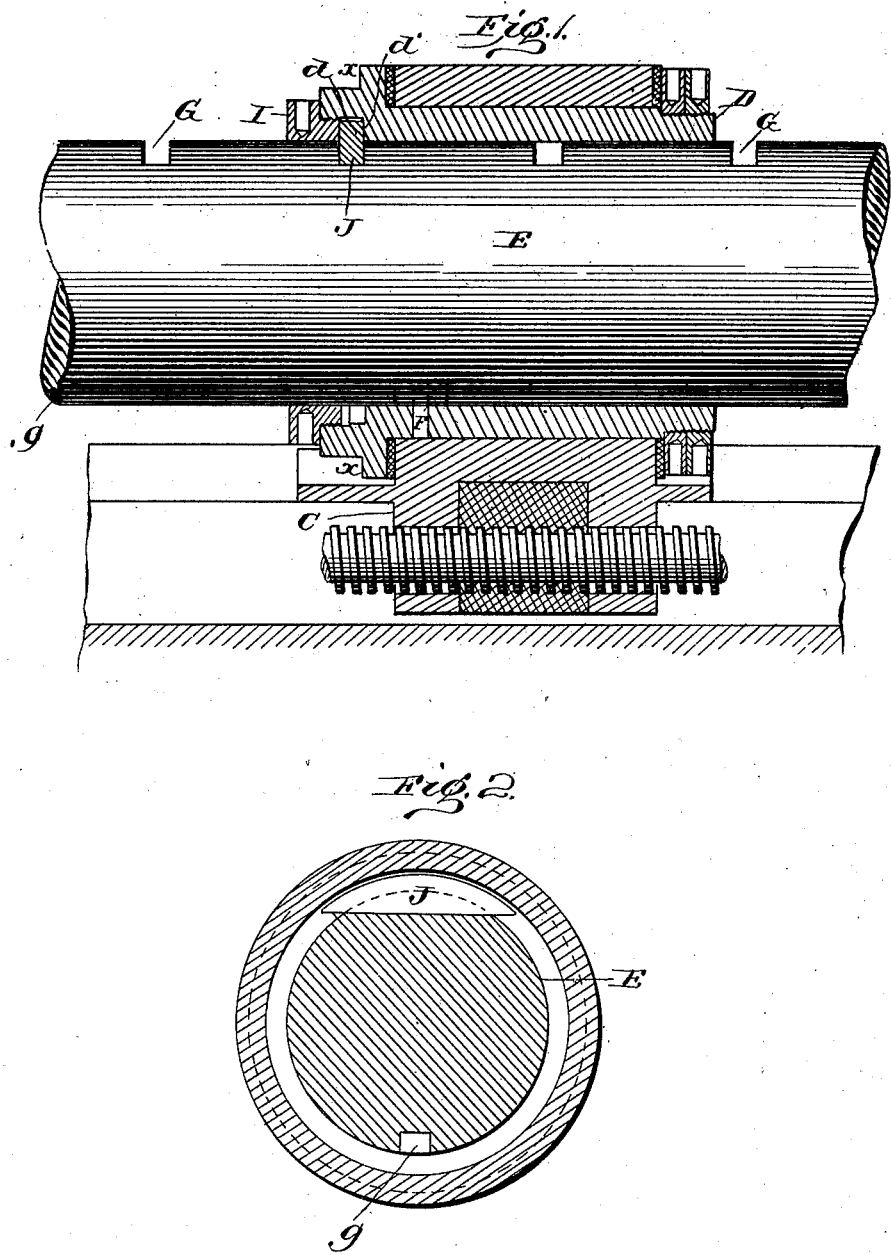
Witnesses
J. M. Fowler Jr.
Al. C. Newman,
Inventor
Geo. H. Smith
By O. H. Rudlong Atty.

UNITED STATES PATENT OFFICE.

GEORGE H. SMITH, OF PROVIDENCE, RHODE ISLAND, ASSIGNOR TO THE BEAMAN & SMITH COMPANY, OF PROVIDENCE, RHODE ISLAND, A CORPORATION.

ADJUSTABLE ATTACHMENT FOR HORIZONTAL SPINDLE DRILLING AND BORING MACHINES.

SPECIFICATION forming part of Letters Patent No. 718,955, dated January 20, 1903.

Application filed November 7, 1901. Serial No. 81,483. (No model.)

*To all whom it may concern:*

Be it known that I, GEORGE H. SMITH, a citizen of the United States, residing at Providence, in the county of Providence and State of Rhode Island, have invented certain new and useful Improvements in Adjustable Attachments for Horizontal Spindle Drilling and Boring Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an adjustable attachment for spindles in general, but more particularly for the horizontal spindle drilling and boring machines; and it consists of the parts and combination of parts, as will be more fully pointed out.

In the drawings, Figure 1 is a vertical longitudinal section of my invention, the spindle being in elevation. Fig. 2 is a section of the same on the line X X.

E represents the spindle of approved pattern, which has a sliding fit in the sleeve D, the spindle having a series of transverse grooves G and a groove *g* running lengthwise.

C is the carrier for moving the spindle endwise, in which the sleeve D is mounted, one end of the sleeve D being bored out larger, as at *d*, to form a shoulder *d'*, the enlarged portion being provided with screw-threads.

I is a threaded collar adapted to be screwed into the portion *d*.

J is a key having a straight lower face, while its upper edge projects into recesses of the sleeve D, as shown in both of the figures of the drawings. This key is adapted for engagement in the transverse grooves G, formed in the spindle, or groove could be burned in spindle extending all around it and a key placed anywhere in said groove; but I prefer the construction shown.

F is a key extending from the sleeve D into the groove *g* of the spindle, thereby locking the sleeve and spindle for purposes of rotation.

The spindle E has a sliding fit through the sleeve D, and by action of the key F said sleeve is caused to revolve coincidently with the spindle.

The sleeve D has a running fit in the carrier C for moving the spindle endwise, and the threaded collar I is screwed into the enlarged end of the sleeve D against the key J, whereby the sleeve D and the spindle E are secured together for all practical purposes as one piece.

To change the position of the spindle E in the sleeve D, the nut or collar I is "backed" out, the sleeve D then being moved away from the key J, allowing the key to be removed. The key J is then replaced in any of the slots G desired and the sleeve D moved over it, and the nut I is then screwed into position, thereby locking the parts solidly together again.

As the power to move the spindle E lengthwise is transmitted through the carrier C, it is essential that the spindle E should respond to such action absolutely, as any slip of the spindle through the sleeve D would result in loss of movement and unsatisfactory work by the machine. By the construction herein shown and described this slippage is avoided.

Having thus described my invention, what I claim, and desire to secure by Letters Patent, is—

1. An adjustable attachment for drills comprising a spindle provided with grooves, a carrier, a sleeve mounted therein, a key fitting the grooves in the spindle, and a joint nut or collar adapted to lock the key against said sleeve.

2. An attachment for boring-machines, comprising a spindle, a spindle-carrier, a sleeve mounted therein, one end of which is bored out and screw-threaded, a screw-threaded collar adapted to engage the threaded portion of the sleeve, a means for engaging said collar to lock the spindle in said sleeve.

3. An adjustable attachment for boring-machines, comprising a spindle-carrier, a sleeve having a running fit therein and provided with interior screw-threads, a spindle having a sliding fit in said sleeve, said spindle having a series of transverse grooves and a lengthwise groove, a threaded clamping-collar, a key fitting the transverse grooves and adapted to be clamped to the sleeve by said collar, and a key extending from the sleeve into the lengthwise groove in the spindle.

In testimony whereof I affix my signature in presence of two witnesses.

GEORGE H. SMITH.

Witnesses:
JOSEPH H. PEARCE,
WALTER J. B. SMITH.